US005696530A

United States Patent [19]
Maejima

[11] Patent Number: 5,696,530
[45] Date of Patent: Dec. 9, 1997

[54] METHOD OF MOVING ENLARGED IMAGE WITH MOUSE CURSOR AND DEVICE FOR IMPLEMENTING THE METHOD

[75] Inventor: Yoshinobu Maejima, Tokyo, Japan

[73] Assignee: NEC Corporation, Tokyo, Japan

[21] Appl. No.: 438,089

[22] Filed: May 8, 1995

[30] Foreign Application Priority Data

May 31, 1994 [JP] Japan .................................... 6-118977

[51] Int. Cl.$^6$ .................................................... G09G 5/00
[52] U.S. Cl. ............................................. 345/127; 345/145
[58] Field of Search ..................................... 345/163, 127,
345/128, 129, 130, 131, 121, 145; 395/139,
157, 326

[56] References Cited

U.S. PATENT DOCUMENTS

| 4,532,605 | 7/1985 | Waller .................................... 345/131 |
| 5,073,771 | 12/1991 | Satta et al. ............................. 345/127 |

FOREIGN PATENT DOCUMENTS

| 4127196 | 4/1992 | Japan .................................... 345/131 |
| 4-337873 | 11/1992 | Japan . |

Primary Examiner—Dennis-Doon Chow
Attorney, Agent, or Firm—Foley & Lardner

[57] ABSTRACT

When drawing is being executed in an enlarged display that moves with the movement of a mouse, because the movement of the enlarged display area centers on the point of the whole image indicated by the moving mouse cursor, a difference arises between the amount of movement of the mouse cursor in relation to the whole image and the amount of movement of the mouse cursor in relation to the enlarged display image. An enlarged display movement method is disclosed that eliminates this difference. Enlarged display of an area centering on a point of a whole image indicated by a mouse cursor is displayed superposed over the original image and centered on the indicated point. As long as the mouse cursor is within the enlarged display area, drawing can be executed within the enlarged displayed area without the enlarged display area being moved, and when the mouse cursor moves outside the enlarged display area, a new enlarged display is executed centering on the present point indicated by the mouse cursor.

6 Claims, 3 Drawing Sheets

METHOD OF MOVING ENLARGED IMAGE WITH MOUSE CURSOR AND DEVICE FOR IMPLEMENTING THE METHOD

BACKGROUND OF THE INVENTION

1. Filed of the Invention

The present invention relates to a method and device for moving enlarged display with a mouse-cursor, and particularly to a method and device for moving enlarged display while drawing 2. Description of the Related Art Drawing of a picture into an enlarged display has been made in the prior art when it is difficult to draw details of a picture.

Generally, when executing drawing operations using a display screen in which one dot of image data corresponds to one dot on the screen, the target area is enlarged when detailed drawing in one-dot units must be carried out. In some cases, this enlarged display covers the entire screen, while in others, the enlarged display appears in an area of a particular size established on one portion of the screen.

When the enlarged display is presented on one portion of the screen, the whole image being drawn is displayed on the remaining area of the screen, and in this way, the operator can draw details while keeping a grasp of the whole image. One problem in this case, however, is that because the whole image is displayed on a portion of the screen, the reduced whole image is displayed, and consequently an accurate whole image display may not always be possible.

When the enlarged display covers the entire screen, complete information for the image can be obtained by using scroll function of the image display device to shift the content displayed in the display area vertically or horizontally to view the detailed display in successive increments. In this case, scroll bars in the x and y directions are used to display the current x and y coordinates in order to indicate the position of the currently displayed image within the whole image. Even with this method, however, it is difficult to intuitively grasp the position of a currently displayed screen within the whole image.

One image display device for overcoming this problem is disclosed, for example, in Japanese Patent Laid-open No. 337873/92. In this device, at least two display areas are established on the display screen, one display area showing the whole image of the display image, and the other display area showing an enlarged image of one portion of the whole image. In the area for the whole image displayed are a cursor for designating a region and a display frame for indicating the an enlarged area. In the other display area, the area of the image enclosed within the display frame is displayed in enlarged or reduced form. These two display areas are displayed superposed, and one or the other of the display areas moves with the movement of the cursor. In a preferred embodiment, the whole image is displayed over the entire screen, and the enlarged display area is displayed superposed over the whole image in accordance with the movement of a mouse cursor.

In this enlarged display of the prior art, because the area of enlarged display moves in accordance with the movement of the mouse cursor, the image within the area of enlarged display moves rapidly at a velocity proportional to the scale of enlargement with respect to the movement of the mouse cursor. This rapid movement presents no problem if the enlarged displayed image is only to be observed, but when drawing of details is required, it may be extremely difficult due to the difference between the amount of movement of the mouse cursor in relation to the whole image and the amount of movement of the mouse cursor in relation to the enlarged display image.

SUMMARY OF THE INVENTION

The above-described state of the prior art was taken into consideration in arriving at the present invention. The object of the present invention is to solve the above-described problems existing in the prior art technology, to eliminate the difference between the amount of cursor movement in relation to the screen and the amount of cursor movement in relation to the enlarged display image, and moreover, to provide a novel enlarged-display movement method and device of a mouse-cursor follow-up type by which the vicinity of the mouse cursor can be surely enlarged.

To achieve this object, the enlarged-display movement method according to the present invention comprises:

a first step of enlarging a designated area corresponding to a desired position of a mouse cursor and displaying an enlarged image;

a second step of holding the enlarged image unmoved, and moving the mouse cursor and detecting the position thereof, while the mouse cursor is within a region of the enlarged display;

a third step of restoring the displayed image to the state preceding the enlarged display, when it is detected that the mouse cursor has moved outside the region of the enlarged display, and subsequently enlarging the designated area corresponding to a new position of the mouse cursor and displaying a new enlarged image; and succeeding steps of repeating said first to third steps for new enlarged image.

The size of the enlarged display screen can be freely varied.

A device for moving an enlarged image with a mouse cursor according to the present invention comprises:

video RAM;

a display that displays an image corresponding to image data stored in video RAM;

memory for saving image data other than image data for enlarged display from that area of video RAM into which enlarged display is written when enlarging any area of a display screen;

a mouse for providing a signal for controlling mouse cursor movement according to a user's command;

mouse control means for detecting a position of a mouse cursor that is moved according to a user's command provided from the mouse;

enlargement processing means for enlargement-processing image data supplied when the mouse provides a command to enlarge a display image, and for reduction-processing image data supplied when the mouse provides a command to restore the display image to the state preceding enlargement;

data transmission means for, when a display image is to be enlarged, executing transmission control for saving from video RAM to memory, image data other than image data for enlarged display in an area of video RAM into which enlarged display is written; transmission control for transmitting image data for enlarged display from video RAM to the enlargement processing means; transmission control for transmitting the result of enlargement processing to the area of video RAM into which enlarged display is written; and when an enlarged display is to be restored to the state preceding enlargement, executing transmission control for transmitting image data from the area of video RAM into which enlarged display has been written to the enlargement processing means; transmission control for transmitting image data that have been reduced by the enlargement processing means from the enlargement processing means to the area of video RAM preceding enlargement; and transmission control for transmitting data saved to the memory to the area of video RAM before saving;

wherein, when the user commands enlarged display and the mouse cursor is moved while enlarged display is currently being executed, the mouse control means defers the output of the command for enlarged display as long as the mouse cursor is within the region of the enlarged display currently being executed, and when it is detected that the mouse cursor has moved outside said region of the enlarged display, the mouse control means outputs the command for enlarged display to the data transmission means and the enlargement processing means.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENT

A preferred embodiment of the present invention will next be explained in concrete terms with reference to the figures.

Figure 1:
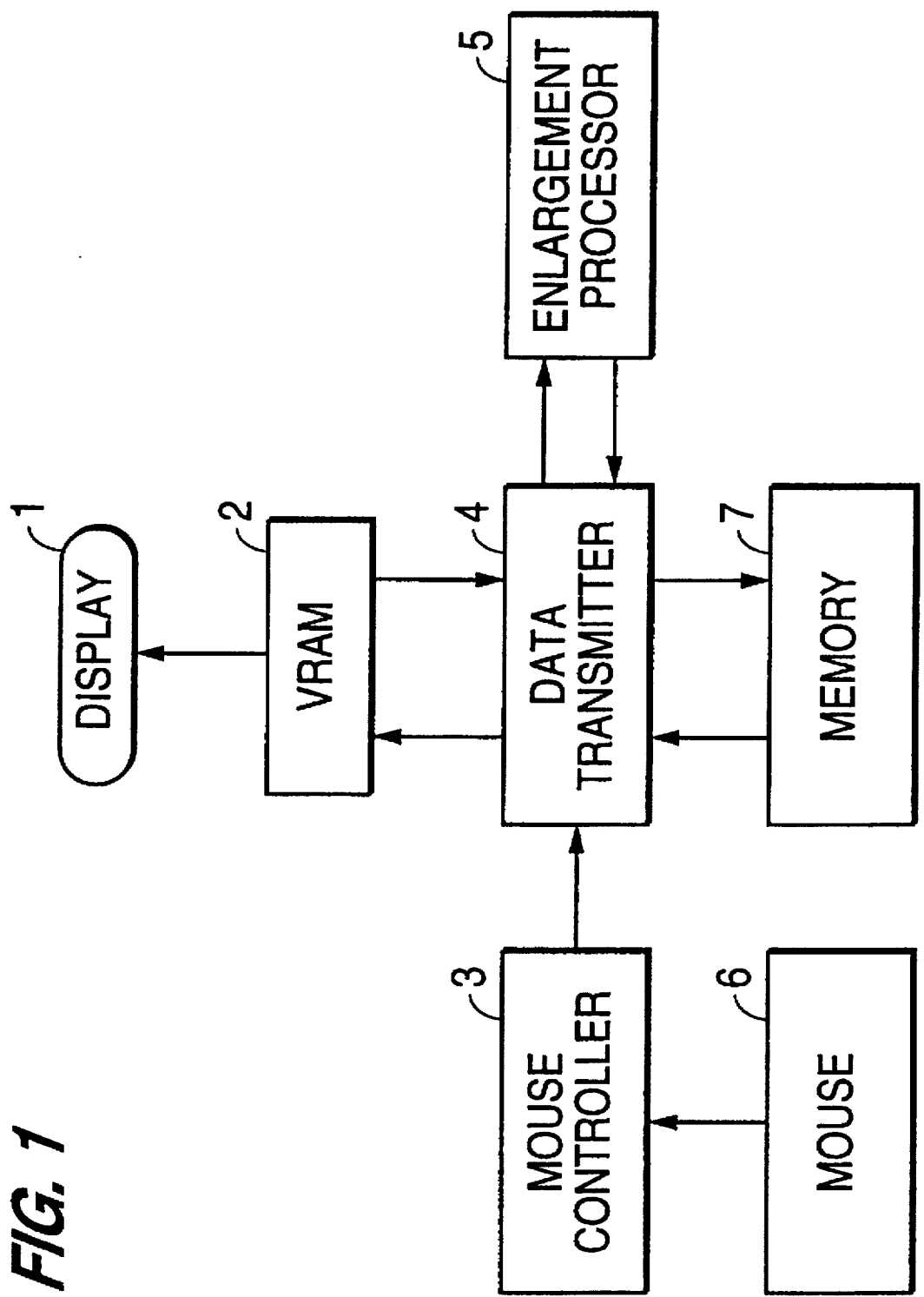
FIG. 1 is a block diagram showing an embodiment of the present invention.
Figure 2:
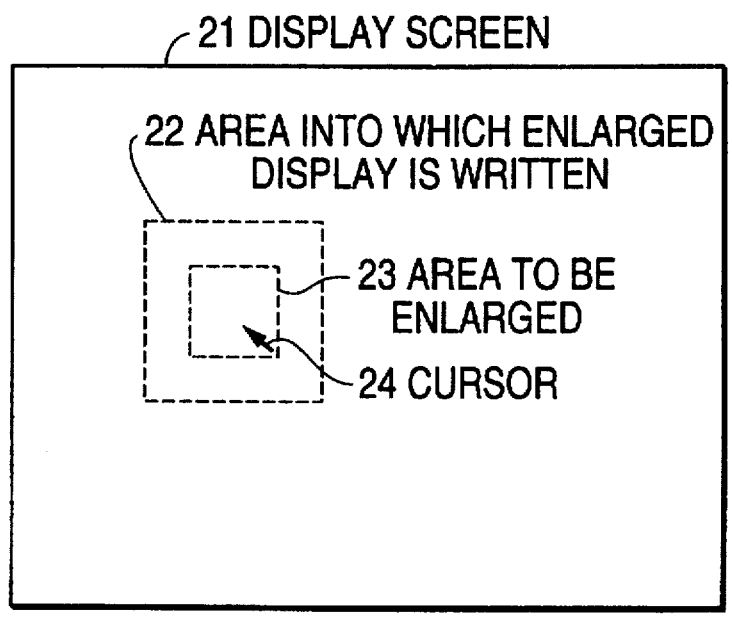
FIG. 2 is a schematic diagram showing an areal composition of video RAM when the enlargement of display is not carried out.
Figure 3:
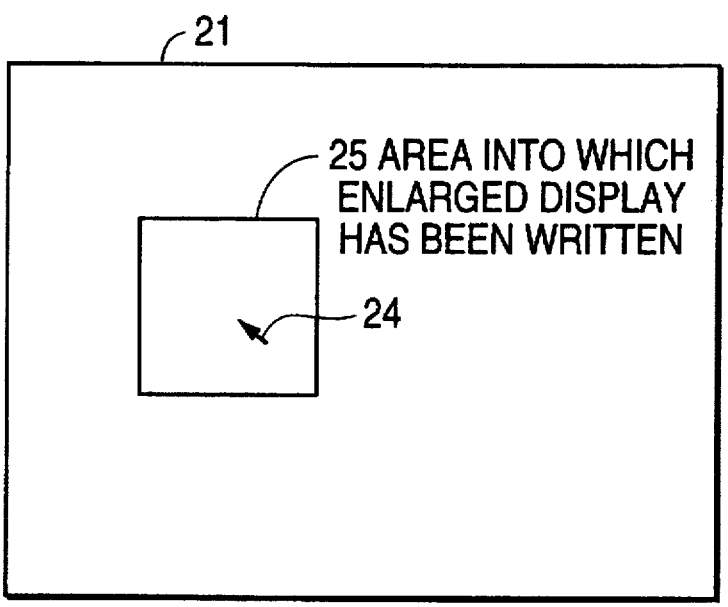
FIG. 3 is a schematic diagram showing the areal composition of video RAM after the enlargement of display was carried out.

FIG. 1 is a block diagram showing an embodiment of the present invention, FIG. 2 is a schematic diagram showing the areal composition of VRAM when enlargement of display is not carried out, and FIG. 3 is a schematic diagram showing the areal composition of VRAM after the enlargement of display was carried out. In FIGS. 2 and 3, mouse cursor 24 shows the position of the mouse cursor on the display screen. In FIG. 3, area 25 is the enlarged display of area 23 in FIG. 2.

An image display device that implements the method of moving an enlarged display with a mouse-cursor of the present embodiment comprises display 1, video RAM (VRAM) 2, mouse controller 3, data transmission section 4, enlargement processor 5, mouse 6, and memory 7.

Mouse 6 provides signals that control the movement of the mouse cursor in accordance with the user's command issued through handling.

The display 1 displays one dot of an image corresponding to each dot of image data stored in VRAM 2. The area of VRAM 2 therefore has a one-to-one correspondence with the area of the display.

Memory 7 is provided for, when enlarging any area 23 of the display image, saving the image data other than image data for the enlarged display from that area 25 of VRAM into which enlarged display is written.

Mouse controller 3 detects the position of the mouse cursor that moves according to the user's command provided from mouse 6.

Enlargement processor 5 enlargement-processes image data supplied when enlarging of a display screen is commanded, and reduction-processes supplied image data when returning a display image that has been enlarged to the display before enlarging.

When enlarging a display image, data transmitter 4 executes transfer control for saving, of image data in the area of VRAM 2 into which enlarged display is to be written, image data other than image data for enlarged display from VRAM 2 to memory 7; transfer control for transferring image data stored in an area 23 to be enlarged of VRAM 2 (image data for enlarged display) from VRAM 2 to the enlargement processor 5 for enlargement processing; and transfer control for transferring image data that have undergone enlargement processing to the area 22 of VRAM 2 into which enlarged display is written. When an enlarged display is to be returned to the state preceding enlargement, data transmitter 4 executes transfer control for transferring image data from area 25 into which enlarged display for area 23 has been executed to the enlargement processor 5; transfer control for transferring image data that have been reduced by the enlargement processor 5 from the enlargement processor 5 to the position of VRAM 2 before enlarging; and transfer control for transferring data having been saved to memory 7 to the area of VRAM 2 preceding saving.

Figure 4:
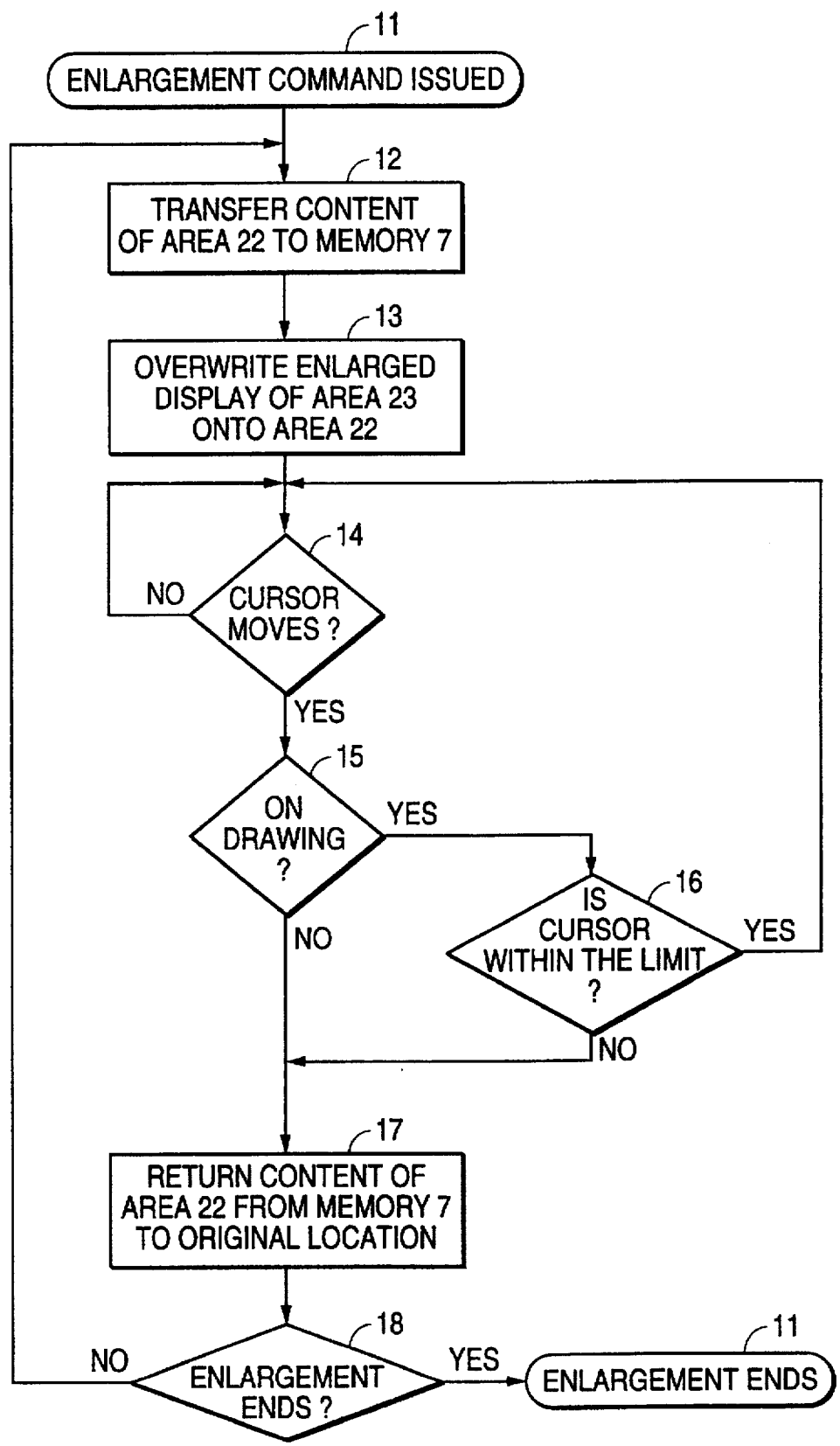
FIG. 4 is a flow chart showing an embodiment of the present invention.

The operation of the present embodiment will next be explained with reference to FIG. 4.

When a command to execute enlarged display is issued (Step 11) from mouse 6, this command is detected by mouse controller 3, data transmitter 4 saves from VRAM 2 to memory 7 image data other than image data stored in the area 23 for enlarged display, out of the image data in area 22 within VRAM 2, and these image data are reserved in memory 7 (Step 12). Data transmitter 4 next transfers image data in area 23 of VRAM 2 to enlargement processor 5, and the image data that have been submitted to enlargement processing are written to area 25 of VRAM 2 (Step 13). Here, areas 22, 23 and 25 are all areas of any size centering on a point of VRAM corresponding to the point indicated by mouse cursor 24 on the display screen. Areas 22 and 25 are of the same size, and the aspect ratios of both area 22 and 25 to area 23 are the same.

Processing at the time the mouse cursor is moved will next be explained. Movement of the mouse cursor may involve either simple movement of the mouse cursor position without drawing a line (moving the mouse without clicking) or moving the mouse while drawing a line (moving the mouse while holding the mouse button down).

Examples of each will be explained hereinbelow.

As in the prior art, when moving the mouse without drawing a line, the data for area 22 which have been reserved in memory 7 are first transferred to the original location in VRAM 2 by data transmitter 4 to recover the state before enlarging (Step 17). If a request to end enlarged display is commanded at this time (Step 18), enlarged display is ended (Step 19). Next, centering on the new position indicated by the mouse cursor 24, the positions of areas 22, 23 and 25 are set (as address regions in VRAM 2, areas 22 and 25 are the same region, but they are designated with differing reference numerals because the stored content is different), and the above-described saving of area 22, enlargement processing of area 23, and writing of area 25 are executed. By executing these operations with each movement of the mouse, enlarged display centering on the mouse cursor 24 can be continuously executed.

When moving the mouse while drawing a line, drawing is executed within an enlarged area without moving the enlarged display as long as the point indicated by the mouse cursor 24 is within the limits of enlarged display area (the region of the enlarged display) 25 (Step 16). In this case, even should a command to enlarge the display be issued, mouse controller 3 defers the output of this command. If mouse controller 3 detects displacement of the position indicated by the mouse cursor 24 to the outside of the enlarged display region, the image data which have been enlarged in the area 25 are reduction-processed, and transferred to the original location in VRAM 2 by data transmitter 4. Subsequently, data for area 22 that have been saved in memory 7 are transmitted to the original position in VRAM 2 by data transmitter 4 and the display recovers the state before enlargement (Step 17). If a request to end enlargement of display is issued at this time (Step 18), the enlargement of display is ended (Step 19). Next, taking, as a new center of the display area, the point on the whole image that corresponds to the point indicated by the mouse cursor 24 on the enlarged image at that time, areas 22, 23, and 25 that center on the point in VRAM that corresponds to this new center are established, and the above-described saving of area 22, enlargement of area 23, and writing of area 25 are executed. In this way, the point indicated by mouse cursor 24 is at all times within the enlarged display area, and moreover, enlarged display can be carried out in which the amount of movement of the mouse cursor in relation to the whole image does not differ from the amount of movement in relation to the enlarged image.

While the scale of enlargement and size of the enlarged display area have been presented as fixed values in the above-described embodiment, these factors can be freely varied, and may also be established with the request to begin enlarged display.

Further, in cases where the whole image is too large to fit onto the screen, drawing of portions lying beyond the screen may be executed by causing the whole image to scroll by the action of attempting to move the mouse cursor outside the edge of the screen.

For cases of movement without line drawing, just as for movement while drawing a line, enlarged display is effected so that the enlarged display screen is fixed without movement despite movement of the mouse cursor as long as the mouse cursor is within the enlarged display region and when movement of the mouse cursor beyond the limits of the enlarged display screen is detected, enlarged display is effected.

As explained hereinabove, the method and device for moving an enlarged display according to the present invention allows the amount of movement of the mouse cursor in relation to the whole image to be equal to the average amount of movement of the mouse cursor in relation to the enlarged display screen, permitting the vicinity of the mouse cursor to be displayed in an enlargement mode, by prohibiting the enlarged display image from movement while the mouse cursor is within the enlarged display screen, but permitting enlargement of a new region centered on a position of the mouse cursor when the mouse cursor moves outside the enlarged display region.

The movement method of the enlarged display area of the present invention and its device can also be effectively employed by allowing free switching between the movement method of the enlarged display area of the present invention and the movement method of the enlarged display area according to the prior art.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of displaying an enlarged image on a display with a mouse cursor on the display, comprising:

detecting a position of the mouse cursor on the display;

enlarging a predetermined area corresponding to the mouse cursor position to thereby enlarge an image corresponding to the predetermined area;

displaying the enlarged image on the display;

as a first mode of operation, selectively maintaining the enlarged image on the display while permitting the mouse cursor to move within the area of the enlarged image and restoring the enlarged image to a state preceding the enlargement when the mouse cursor is moved outside the enlarged image area;

enlarging a new predetermined area corresponding to a new mouse cursor position to thereby enlarge an image corresponding to the new predetermined area when the mouse cursor is moved outside the previously enlarged image area;

displaying the new enlarged image on the display.

2. A method according to claim 1, wherein the predetermined area to be enlarged is selectively variable.

3. A method according to claim 1, wherein the size of the enlargement is selectively variable.

4. A method according to claim 1, further comprising:

as a second mode of operation, selectively maintaining the mouse cursor always on a center of an image to be enlarged and enlarging and displaying the image centered around the mouse cursor position, wherein the first and second modes are selectively switchable.

5. A method according to claim 1, further comprising scrolling an entire image on the display and allowing display of portions not present before scrolling when the entire image is larger than the display.

6. A device for displaying an enlarged image with a mouse cursor, comprising:

a video memory device for storing image data;

a display for displaying an image corresponding to the image data stored in the video memory device;

a memory device for saving an image information other than that of the enlarged image from an area of the video memory device into which the enlarged image is written when enlarging any area of the display;

a mouse for controlling movement of the mouse cursor;

a mouse controller for detecting a position of the mouse cursor;

an enlargement processor for processing the image data supplied when the mouse provides a command to enlarge an image and when the mouse provides another command to restore the image to a state preceding the enlargement;

a data transmission controller for, when the image is to be enlarged, executing transmission control for saving from the video memory device to the memory device, the image information other than that of the enlarged image in the area of the video memory device into which the enlarged image is written, for transmitting the image data for enlarged display from the video memory device to the enlargement processor, for transmitting results of enlargement processing to the area of the video memory device into which the enlarged image is written; and when the enlarged image is to be restored to the state preceding the enlargement, executing transmission control for transmitting the image data from the area of the video memory device into which the enlarged image has been written to the enlargement processor, for transmitting the image data that has been reduced by the enlargement processor from the enlargement processor to the area of the video memory device preceding the enlargement, and for transmitting the information saved to the memory device to the area of the video memory device before saving, wherein, when the mouse issues the enlarged image command while the mouse cursor is moved, the mouse controller defers the output of the command for a new enlarged image as long as the mouse cursor is within the region of the enlarged image currently being executed, and when the mouse controllerdetects that the mouse cursor has moved outside the region of the enlarged image, the mouse controller outputs a command for display of a new enlarged image to the data transmission controller and the enlargement processor.

* * * * *